(12) United States Patent
Lee (10) Patent No.: US 11,533,409 B2
(45) Date of Patent: Dec. 20, 2022

(54) POWER CONSUMPTION REDUCTION BASED ON STATE OF CABLE CONNECTION

(71) Applicant: Hewlett-Packard Development Company, L.P., Spring, TX (US)

(72) Inventor: Jin-Woo Lee, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/299,172

(22) PCT Filed: May 22, 2020

(86) PCT No.: PCT/US2020/034217
§ 371 (c)(1),
(2) Date: Jun. 2, 2021

(87) PCT Pub. No.: WO2020/256890
PCT Pub. Date: Dec. 24, 2020

(65) Prior Publication Data
US 2022/0103710 A1    Mar. 31, 2022

(30) Foreign Application Priority Data
Jun. 19, 2019  (KR) .......................... 10-2019-0072761

(51) Int. Cl.
*H04N 1/00* (2006.01)
*G06F 3/12* (2006.01)

(52) U.S. Cl.
CPC ....... *H04N 1/00896* (2013.01); *G06F 3/1221* (2013.01); *G06F 3/1229* (2013.01); *H04N 1/00408* (2013.01); *H04N 1/00907* (2013.01)

(58) Field of Classification Search
CPC ........... H04N 1/00896; H04N 1/00408; H04N 1/00907; G06F 3/1221; G06F 3/1229
See application file for complete search history.

(56) References Cited

U.S. PATENT DOCUMENTS 5,828,863 A * 10/1998 Barrett .................. H04L 43/065
703/24
5,892,893 A    4/1999 Hanf et al.
2003/0154311 A1    8/2003 Critz et al.
(Continued)

FOREIGN PATENT DOCUMENTS

| JP | 20120186557 | 9/2012 |
| JP | 20120212399 | 11/2012 |
| JP | 20180130910 | 8/2018 |

*Primary Examiner* — Kent Yip
(74) *Attorney, Agent, or Firm* — Jefferson IP Law, LLP (57) ABSTRACT

An example image forming apparatus includes a communication device including a physical layer protocol chip for performing communication with a network by using a connector with a light emitting element for displaying a network connection state and a physical layer protocol, a print engine to perform a print job, and a processor to, based on print data being received through the communication device, control the print engine to print the received print data, determine whether a network cable is connected to the connector based on an operation state of the light emitting element, and, based on a determination that the network cable is not connected to the connector, control the physical layer protocol chip to be in a power-saving state.

18 Claims, 6 Drawing Sheets

(56) References Cited

U.S. PATENT DOCUMENTS

2006/0255991 A1    11/2006  De Abreu
2008/0031366 A1*  2/2008  Lin ...................... G06F 13/387
                                                        375/257
2010/0262851 A1*  10/2010  Chien .................... H04L 12/12
                                                        713/320
2012/0204048 A1    8/2012   Kim et al.
2013/0179571 A1*  7/2013  Torii ...................... H04L 67/14
                                                        709/225

* cited by examiner

POWER CONSUMPTION REDUCTION BASED ON STATE OF CABLE CONNECTION

BACKGROUND

An image forming apparatus may include an apparatus for printing print data generated by a terminal device such as a computer on a recording medium such as paper. Representative examples of the apparatus include a printer, a copier, a facsimile, a scanner, and a multifunction peripheral (MFP) that integrally implements these functions.

DETAILED DESCRIPTION OF EXAMPLES

Hereinafter, various examples of the disclosure will be described with reference to the accompanying drawings. The examples to be described below may also be modified in various forms. In order to more clearly describe features of the examples, a description of matters which are well known to those to skilled in the art to which the examples pertain may be omitted.

In the following description, an element that is described as being "connected" with another element includes a case in which the elements are directly connected as well as a case in which the elements are connected indirectly, for example with another element therebetween. An element that is described as "including" another element indicates that the element may not exclude another element and may further include additional elements, unless specifically stated otherwise.

In the following description, the term "image forming job" may refer to various jobs (e.g., copying, printing, scanning, or faxing) related to an image, such as forming the image and/or generating/storing/transmitting an image file, and the term "job" may refer to the image forming job in some examples, and may also refer to a series of processes necessary for performing the image forming job in other examples.

The term "image forming apparatus" may refer to an apparatus that prints print data generated by a terminal apparatus such as a computer on a recording medium, such as paper. Examples of such an image forming apparatus include a copier, a printer, a scanner, a facsimile, or a multi-function printer (MFP) that combines functions thereof through a single apparatus.

The expression "printing data" as used herein may refer to data converted into a format that can be printed at the printer. When the printer supports direct printing, the file itself may be the printing data.

The expression "user" as used herein may refer to a person who performs a manipulation related with the image forming job using the image forming apparatus or a device connected to the image forming apparatus in a wired or wireless manner.

The expression "normal mode" as used herein may refer to an operation state that enables performance of a print job, or printing of received print data directly, and the expression "power-saving mode" as used herein may refer to an operation mode that blocks (e.g., prevents) or minimizes power supply to a module in order to reduce an amount of power consumed.

Figure 1:
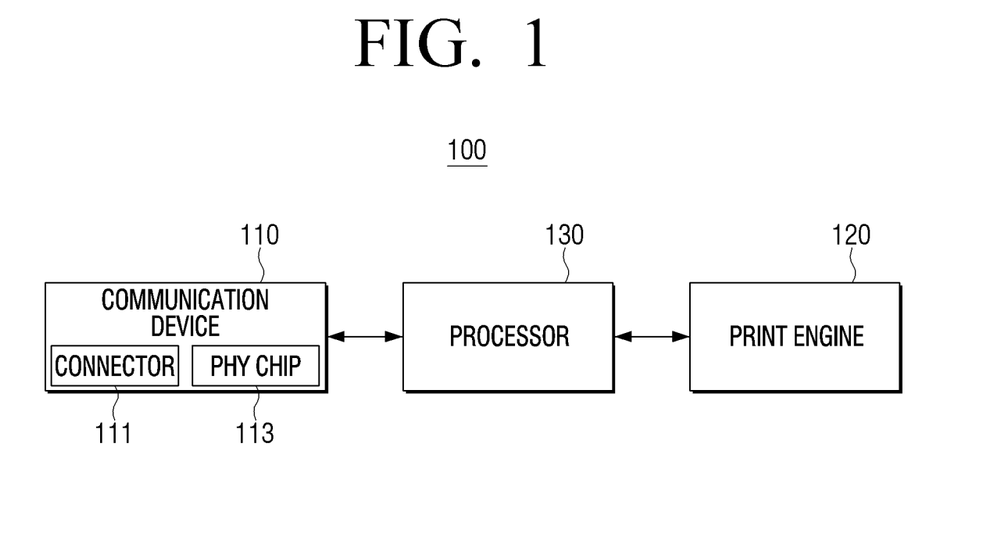
FIG. 1 is a block diagram schematically illustrating a configuration of an image forming apparatus according to an example.

FIG. 1 is a block diagram schematically illustrating a configuration of an image forming apparatus according to an example.

Referring to FIG. 1, an example image forming apparatus 100 may include a communication device 110, a print engine 120, and a processor 130.

The communication device 110 may be connected to a print control terminal device (not shown), and may receive print data from the print control terminal device. The print control terminal device may be an electronic apparatus for providing print data such as a Personal Computer (PC), a laptop, a tablet PC, a smartphone, a server, etc. The communication device 110 may be referred to as a transceiver.

The communication device 110 may support both a wired communication method and a wireless communication method. In an example, when communication is performed with an external device using only the wireless communication method, the communication device 110 may allow an internal hardware configuration using the wired communication method to be in a power-saving state.

An image forming apparatus may receive print data using a wireless communication method as well as a wired communication method. However, although the image forming apparatus supports both the wireless communication method and the wired communication method, the image forming apparatus may be connected to a network using only one of them.

For example, when an image forming apparatus is located in an environment using only the wireless communication method, the image forming apparatus may operate without being connected to a network cable. However, conventionally, even in such an environment, unnecessary power consumption occurs in that power is supplied to a configuration required for the wired communication method.

For example, if a wired cable is not connected to a connector of the image forming apparatus 100, considering that power consumption continuously occurs in a physical layer protocol (PHY) for processing data received through the wired cable even if communication using a wired network is not possible, there is a need for a method for detecting a state in which a wired cable is not connected, and reducing power consumption in an internal configuration related to a wired communication configuration when the wired cable is not connected.

According to an example, whether a network cable is connected to a connector 111 is identified, and if the network cable is not connected, power consumption may be reduced in the physical layer protocol.

The communication device 110 may include a connector 111 and a PHY chip 113 necessary for performing wired communication. In an example, if a network cable is not connected to the connector 111, the communication device 110 may stop the operation of the PHY chip 113 to reduce power consumption. An example configuration and operation of the communication device 110 will be described below.

The connector 111 may be connected to a network cable (or a wired cable) physically or electrically, and may have a light emitting element that displays a network connection state. In an example, the connector 111 may be an RJ-45 connector, but the connector 111 is not limited thereto.

The RJ-45 connector may be a connector used for connecting a computer local area network (LAN) line (i.e., a network cable) by using 8 conductors. The RJ-45 connector may include a light emitting element that displays whether a system is connected to a network. According to an example, it is determined whether the network cable is connected to the connector 111 based on whether the light emitting element of the RJ-45 connector emits light (i.e., turned on).

Hereinafter, for ease of explanation, although the expression 'identify whether a network cable is connected to a connector' is used, in considering that the light emitting element of the RJ-45 connector emits light only when it is normally connected to an opposite side (e.g., a hub, a router, etc.) of the network cable, the expression 'identify whether the image forming apparatus 100 is normally connected to a wired network' can be used.

The network cable may be a cable that connects the network by wire, may be referred to as a LAN cable or a LAN line, and may be implemented by any of various cable standards such as CAT5, CAT5e, CAT6, CAT7 standard unshielded twisted pair (UTP) cable.

The PHY chip 113 may be a chip for performing a physical layer protocol. The physical layer protocol may be a protocol that transmits bit flow through a physical medium (i.e., a network cable), and may transmit and receive data in accordance with the interface characteristic between networks.

The PHY chip 113 may transmit and receive data in accordance with the interface characteristic with the external device (not shown) when the network cable is in connection with the connector 111. The PHY chip 113 may transmit and receive print data and various control data to and from an external device.

The PHY chip 113 may be controlled according to a reset signal provided from the outside (e.g., processor 130). When the reset signal has a first predetermined value (e.g., a high value), the PHY chip 113 may perform a normal operation, and when the reset signal has a second predetermined value (e.g., a low value), the PHY chip 113 may be in a power-saving state. When the reset signal is transitioned from the second predetermined value to the first predetermined value, the PHY chip 113 may perform a reset operation.

The print engine 120 may output print data. The print engine 120 may perform a print job on print data received through the communication device 110, or on pre-stored print data.

The processor 130 may control an operation of the image forming apparatus 100. The processor 130 may be configured as a central processing unit (CPU), an Application Specific Integrated Circuit (ASIC), etc. The processor 130, when print data is received through the communication device 100, may control the print engine 120 to perform printing of the received print data.

The processor 130 may determine whether the network cable is connected to the connector 111 based on a detection signal. The detection signal may be electrically connected to a light emitting element of the connector 111 to have a high value or a low value.

When the received detection signal has a floating value, the processor 130 may determine that the light emitting element is not emitting light, i.e., may determine that the network cable is not connected. The processor 130 may determine that the light emitting element emits light when a detection signal has a value equal to or less than a ground value or a predetermined value.

In the above description, it is described that the connector 111 is determined to be connected to the network cable when the detection signal has a high value. However, this is merely an example and the detection signal may have an opposite value according to a circuit configuration that connects the processor 130 to the light emitting element of the connector 111. In other words, when the detection signal has a low value, it could be determined that the connector is connected to the network cable.

It has been described that the processor 130 determines whether a network cable is connected only using a detection signal without a separate operation. In some examples, the processor 130 may control the communication device 110 to transmit a predetermined signal (e.g., a check signal) to an external device, and determine whether the network cable is connected by using a detection signal in the process of transmitting the signal.

When the network cable is determined as not being connected, the processor 130 may control the communication device 110 so that the PHY chip may be in a power-saving state. The processor 130 may control the communication device 110 so that the reset signal provided to the PHY chip 113 may have a low value.

When it is determined that the network cable is not connected, the processor 130 may prevent the supply of power to a block that performs Media Access Control with respect to the physical layer protocol among a plurality of functional blocks in the processor 130. An example operation will be described in reference to FIG. 3.

The processor 130 may determine the operation mode of the image forming apparatus. The processor 130 may determine the presence or absence of a print job, the elapsed time after the print job, etc. to determine whether to set the operation mode the image forming apparatus 100 to a normal mode or a power-saving mode.

The processor 130 may control each configuration of the image forming apparatus 100 to have an operation state corresponding to the determined operation mode. For example, when the operation mode is determined as a power-saving mode, the processor 130 may control each configuration in the image forming apparatus 100 so that only the communication device 110 and the processor 130 may operate.

In the above description, only a simple configuration constituting the image forming apparatus has been illustrated and described. However, various configurations may be additionally provided. An example thereof will be made below with reference to FIG. 2.

Figure 2:
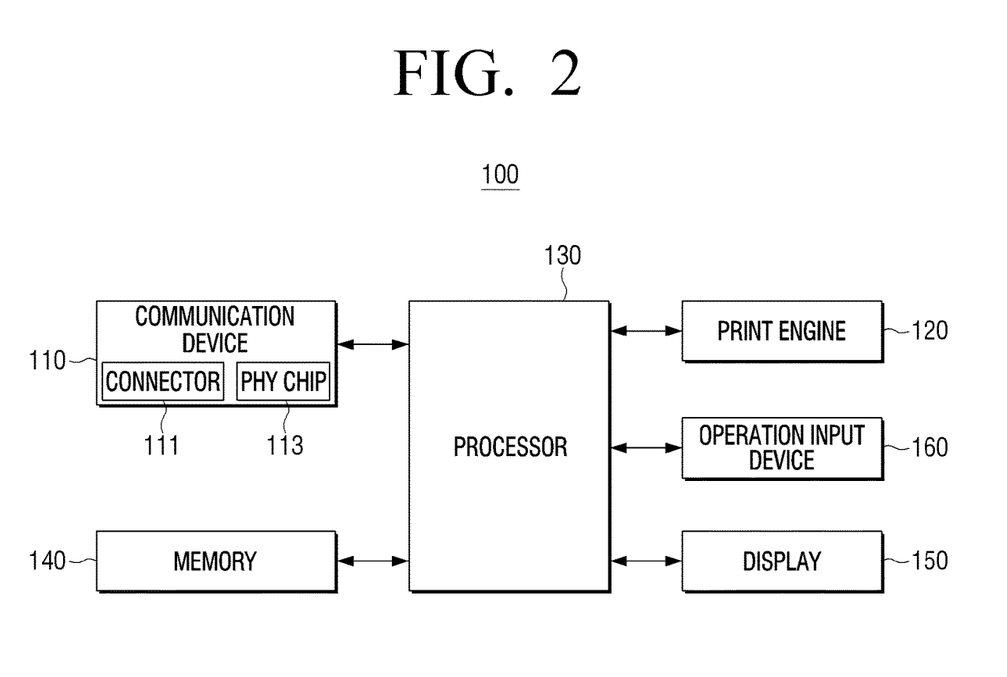
FIG. 2 is a block diagram schematically illustrating a configuration of an image forming apparatus according to an example.

FIG. 2 is a block diagram schematically illustrating a configuration of an image forming apparatus according to an example.

Referring to FIG. 2, an image forming apparatus 100 may include a communication device 110, a print engine 120, a processor 130, a memory 140, a display 150, and an operation input device 160.

The communication device 110 and the print engine 120 have been described with reference to FIG. 1, and thus a repeated description will be omitted. The processor 130 has been described with reference to FIG. 1. Therefore, a repeated description will be omitted, but only the configurations added in FIG. 2 will be described below.

The memory 140 may store print data, such as print data received from the communication device 110. The memory 140 may be embodied as an external storage medium, a removable disk such as a Universal Serial Bus (USB) memory, a web server through a network, etc. as well as a storage medium in the image forming apparatus 100.

The memory 140 may store setting information of the image forming apparatus 100. The setting information may include information on whether a wired communication network is used. Whether the wired communication network is used may be a setting value of a user or a manager who uses the operation input device 160.

The display 150 may display various information provided from the image forming apparatus 100. For example, the display 150 may display the operation state of the image forming apparatus 100, or a user interface window for selecting functions and operations that can be selected by a user.

The display 150 may display the operation state of the image forming apparatus 100. For example, based on the image forming apparatus 100 operating in a power-saving state, the display 150 may display that the image forming apparatus 100 is in the power-saving state.

The operation input device 160 may include a plurality of function keys by which a user can set or select various functions supported by the image forming apparatus 100. The operation input device 160 may be embodied as an apparatus such as a mouse, a keyboard, etc., or a touch screen that may also perform a function of the display 150. The user may input various commands on the image forming apparatus 100.

The operation input device 160 may receive a conversion command of the operation mode of the image forming apparatus 100 from a user. For example, when the operation mode of the image forming apparatus 100 is a power-saving mode, the operation input device 160 may receive a conversion to the normal mode, and when the image forming apparatus 100 is a normal mode, the operation input device 160 may receive a conversion to a power-saving mode.

The operation input device 160 may receive connection status information of a network cable from the user. When receiving a setting that the network cable is not connected from the user, the processor 130 may allow the configurations for a wired network to have a power-saving state. For example, the processor 130 may allow the PHY chip 113 to be in a power-saving state.

When the user's or manager's setting is changed to using a network cable, the processor 130 may allow the PHY chip 113 to perform a normal operation. The processor 130 may allow the reset signal of a high value to be maintained in the PHY chip 113 based on the user's or the manager's setting.

According to an example, the image forming apparatus may identify whether the network cable is connected to the image forming apparatus based on whether the light emitting element is turned on. In addition, if the network cable is not connected, unnecessary power consumption may be prevented from occurring in the configuration for the wired communication, which is advantageous for reducing power consumption and power consumption may be further reduced in the power-saving mode.

For example, in a state in which a network cable is not connected, power supplied to the PHY chip may result in power consumption of about 20.328 mW, even in the power saving mode. According to the disclosure, when power is not supplied to the PHY chip, only about 3.3 mW of power consumption may occur, which reduces about 17 mW power consumption.

Figure 3:
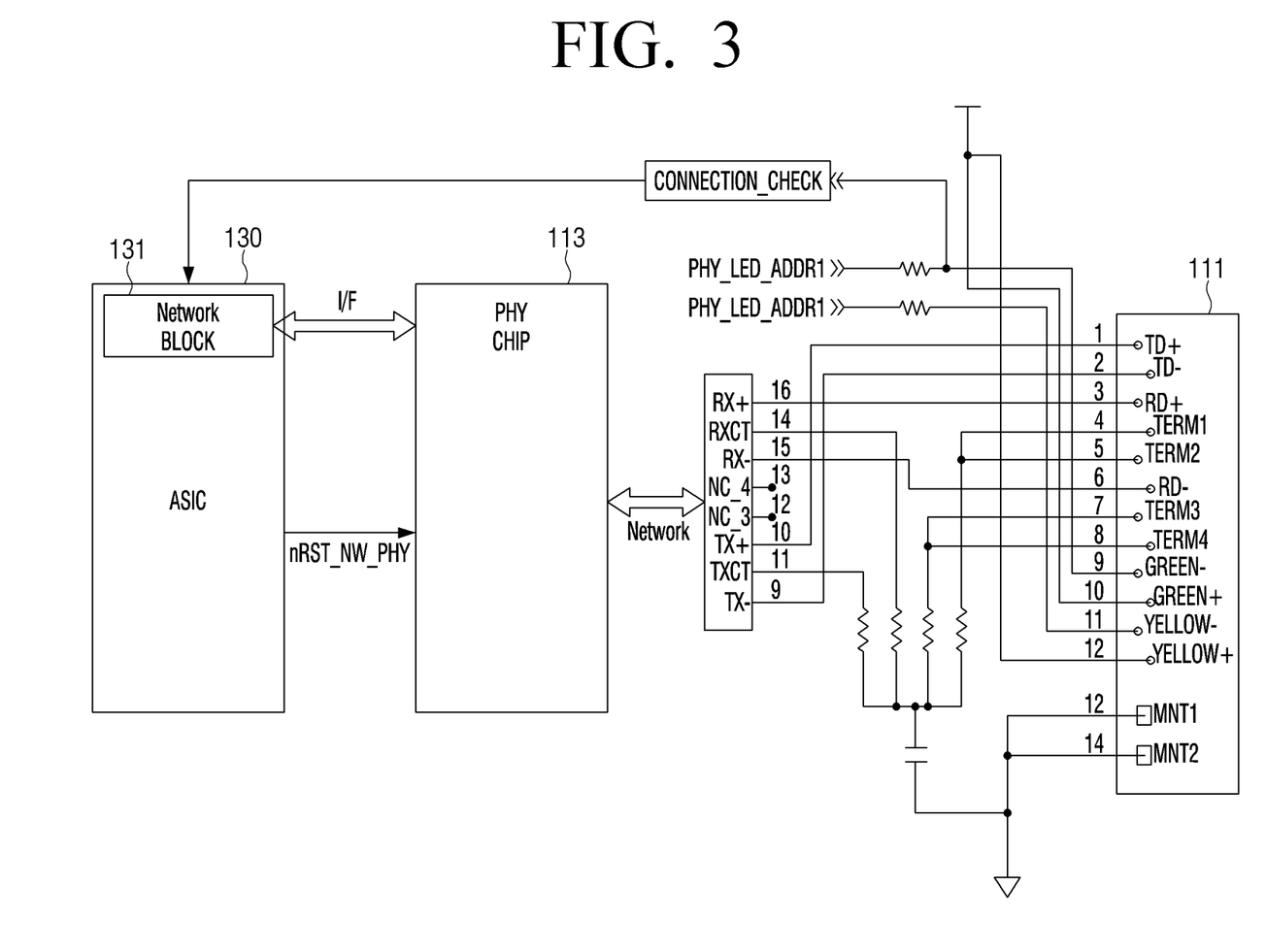
FIG. 3 is a circuit view of a communication device according to an example.

FIG. 3 is a circuit view of a communication device according to an example.

Referring to FIG. 3, the communication device may include the connector 111 and the PHY chip 113.

The connector 111 may contact a network cable. The connector 111 may include a plurality of terminals for electrical connection with the network cable. Each of the plurality of terminals may include one end connected to each of a plurality of conductors in the network cable, and the other end electrically connected to the PHY chip 113.

The connector 111 may include a green light emitting element and a yellow light emitting element that display a network connection state. An example of the connector 111 including a plurality of light emitting elements will be described with reference to FIG. 5.

One end of the green light emitting element of the connector 111 may be connected to a port of the processor 130. Accordingly, the processor 130 may determine whether the light emitting element emits light, that is, whether the network cable is connected based on the signal value detected by the port.

The PHY chip 113 may perform a physical layer protocol that transmits bit flow through a cable. The PHY chip 113 may operate based on a reset signal (nRST_NW_PHY). In an example, when the reset signal has a high value, the PHY chip 113 may operate in a normal mode, and when the reset signal has a low value, the PHY chip 13 may operate in a power-saving mode.

When the reset signal has a high value, the PHY chip 113 may receive print data and various control data from a print control device connected to a network by using a physical layer protocol.

The PHY chip 113 may form a data path with a network block 131 of the processor 130, and transmit the received print data and various data to the network block 131 of the processor 130.

As an example, the network block 131 and the PHY chip 113 may be interconnected to each other in an interface manner such as Media Independent Interface (MII), Reduced Media Independent Interface (RMII), Gigabit Media Independent Interface (GMII), Reduced Gigabit Media Independent Interface (RGMII), etc.

The PHY chip 113 may transmit data provided form the network block 131 to the outside through the connector 111.

The processor 130 may perform communication with the external device by using the PHY chip 113. The processor 130 may include a plurality of functional blocks, and one of the plurality of functional blocks may include the network block 131.

The network block 131 may be a functional block that performs media access control for the physical layer protocol. Accordingly, the network block 131 may be interconnected to the PHY chip 113 using the interface method such as MII, RMII, GMII, RGMII, or the like, and may communicate with an external device by controlling the PHY chip 113.

When the network cable is not connected to the connector 111, the PHY chip 113 and the network block 131 shown in FIG. 3 may not need to operate. Therefore, when it is determined that the network cable is not connected, the processor 130 may output a reset signal (nRST_NW_PHY) of a low value by using a General Power Outlet (GPO) port that outputs the reset signal.

The processor 130 may prevent power supply to the network block 131. In an example, the processor 130 may bring down a pin pad for the network block 131 so that the network block 131 may have a power-saving state.

When the network cable is connected to the connector 111, the light emitting element of the connector 111 may emit light, and identify that the input port value of the processor 130 is changed. Accordingly, the processor 130 may identify that the network cable is connected, allow the reset signal of a high value to be output to the PHY chip 113, and change the power-saving mode for the network block 131 to the normal mode.

The PHY chip 113 may be reset so that the mode may be changed to the normal mode, and a communication channel using the connector 111, the PHY chip 113, and the network block 131 may be used.

An example has been illustrated and described in which the image forming apparatus 100 is embodied using a single processor, and the PHY chip performs a PHY function for the wired communication. However, at the time of implementation, the image forming apparatus may be embodied with a plurality of processors, and the PHY chip may have functions for wired communication and wireless communication. An example thereof will be described with reference to FIG. 4.

Figure 4:
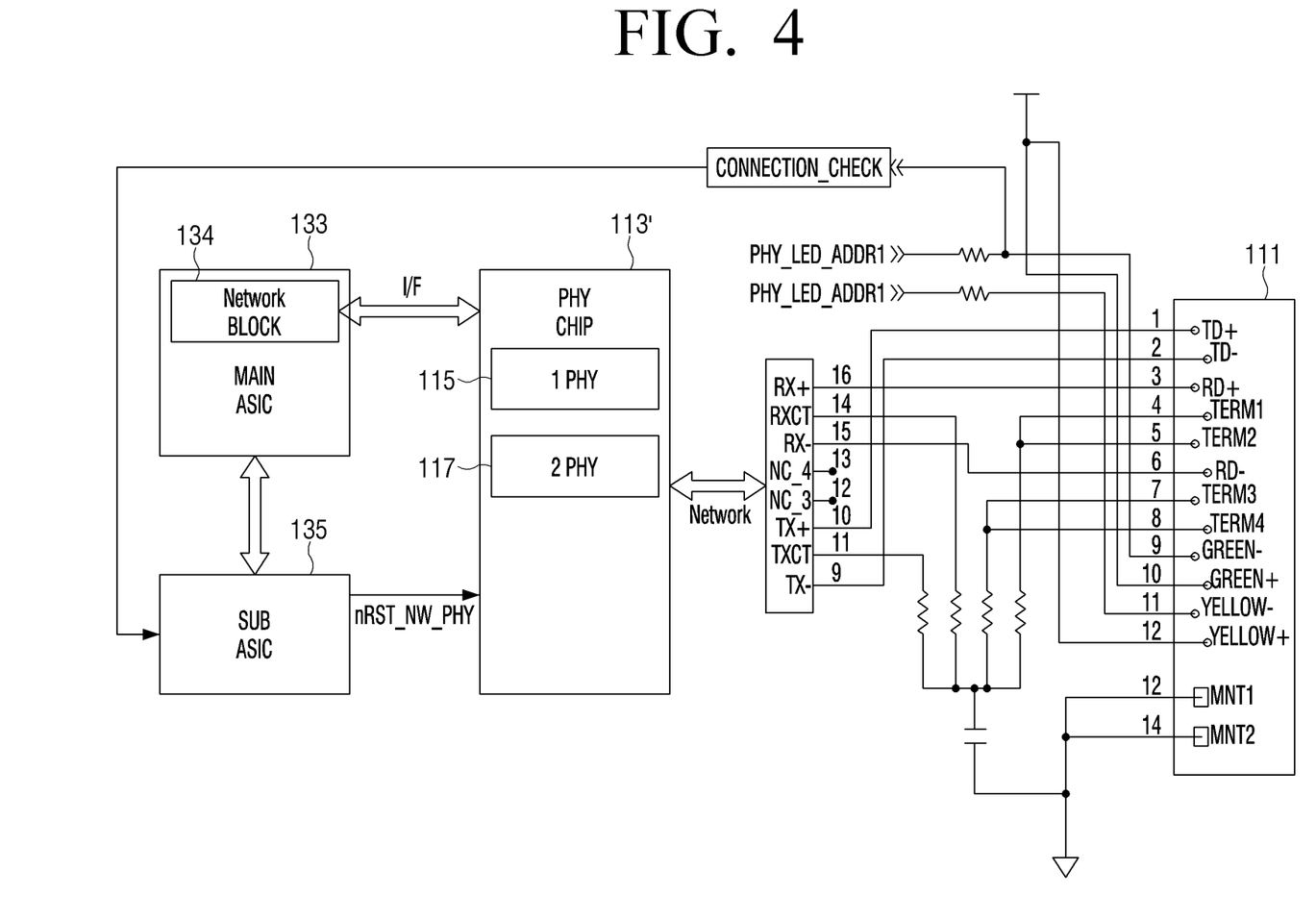
FIG. 4 is a circuit view of a communication device according to an example.

FIG. 4 is a circuit view of a communication device according to an example.

Referring to FIG. 4, a communication device may include a connector 111 and a PHY chip 113'.

The connector 111 is the same as that of FIG. 3, and thus a repeated description thereof will be omitted.

The PHY chip 113' may include two physical layer protocols. A first PHY 115 (or a wired PHY) may be a physical layer protocol that controls bit flow of a wired cable, and a second PHY 117 (or a wireless PHY) may be a physical layer protocol that transmits bit flow through wireless communication (i.e., an antenna). Although not shown, the PHY chip 113' may be electrically connected to antennas for wireless communication.

The first PHY 115 may operate based on the reset signal (nRST_NW_PHY). In an example, when the reset signal has a high value, the first PHY 115 may operate and when the reset signal has a low value, the first PHY 115 may operate in a power-saving mode. The first PHY 115 may transition between the normal mode and the power saving mode depending on whether the network cable is connected regardless of the operation mode of the image forming apparatus 100. In other words, even when the image forming apparatus 100 is in a power-saving mode, the first PHY 115 may operate in a normal mode if the network cable is connected. In addition, even when the image forming apparatus 100 is in a normal mode, if the network cable is not connected, the first PHY 115 may operate in a power-saving mode.

The first PHY 115 may form a data path with a network block 134 of a first processor 133 in a normal mode, and transmit received print data and various data to the network block 134 of the first processor 133. The first PHY 115 may transmit data provided from the network block 134 to the outside through the connector 111.

The second PHY 117 may be a physical layer protocol that transmits bit flow through wireless communication (i.e., an antenna). Even if the first PHY 115 operates in a power-saving mode without the network cable being connected, the image forming apparatus 100 may perform communication with an external device through the second PHY 117.

An example has been descried in which a single interface is included between the first processor 133 and the PHY chip 113'. However, at the time of implementation, the PHY chip 113' and the first processor 133 may include a plurality of interfaces, i.e., the first interface for connecting the first PHY 115 to the first processor 133, and the second interface for connecting the second PHY 117 to a second processor 135.

When the image forming apparatus 100 operates in a normal mode, the first processor 133 may control the function of the image forming apparatus 100. As an example, the first processor 133 may control various functions of the image forming apparatus 100 such as performing print job processing, scan data processing, image processing, etc.

The first processor 133 may include the network block 134 for performing a medium access control with respect to the first PHY 115 in a normal mode of the image forming apparatus 100. As an example, when a network cable is connected, the first processor 133 may receive various data of the network by using the network block 134 and the first PHY 115, and transmit a response signal to the network device.

The second processor 135 may control the PHY chip 113' when the image forming apparatus 100 operates in a power-saving mode. The second processor 135 may be a power-saving controller that operates when the image forming apparatus 100 operates in the power-saving mode.

The second processor 135 may identify whether the network cable is connected to the connector 111 in electric connection with one end of the light emitting element of the connector 111. As a result of identification, the second processor 135 may convert the operation state of the first PHY 115.

The second processor 135, if the network cable is identified as not being connected, may notify this to the first processor 133 so that power to the network block 134 may be reduced.

When it is confirmed that the network cable is connected in the power saving mode, the second processor 135 may transition the reset signal so that the first PHY 115 may be changed to the normal state, and notify the first processor 133 so that the network block 134 may be turned on.

By using the second processor 135 that operates in the power-saving state, even if the image forming apparatus 100 is in the power-saving state, whether the network cable is connected may be identified.

Figure 5:
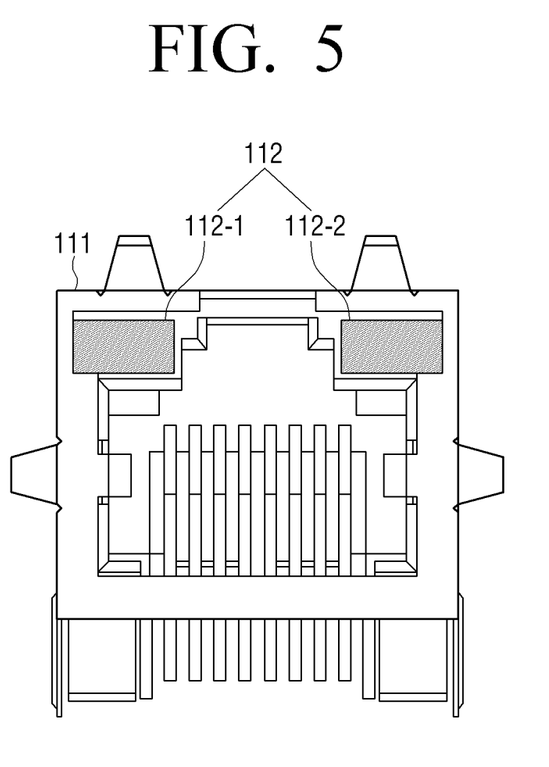
FIG. 5 is a view of a connector connected to a network cable according to an example.

FIG. 5 is a view of a connector connected to a network cable according to an example.

Referring to FIG. 5, the connector 111 may include a terminal to be electrically connected to a network cable, and a plurality of light emitting elements 112 (i.e., 112-1 and 112-2) that display a connection state of the network cable.

When the network cable is connected to the connector 111, the light emitting elements 112-1 and 112-2 may irradiate light of a predetermined color. For example, the first light emitting element 112-1 may be a green Light Emitting Diode (LED) element, and if the network cable is connected, the first light emitting element 112-1 may emit green light.

The second light emitting element 112-2 may be a yellow LED element, and may emit light in the case of substantial data transmission and reception. Therefore, when identifying whether the network cable is connected based on the operation state of the first light emitting element 112-1, the processor 130 may identify whether the network cable is connected by identifying only whether the light emitting element emits light.

When identifying whether the network cable is connected based on the operation state of the second light emitting element 111-2, whether the connector 111 is connected to the network cable may be identified through the operation of identifying whether a light emitting element emits light after the controlling of the operation of transmitting and receiving preset data to an external device.

Referring to FIG. 1 to FIG. 5, an example has been described in which it is determined whether a network cable (e.g., Internet cable) is connected, and correspondingly an operation state of a PHY chip is controlled. However, the disclosure may be applied to a case in which it is determined whether a telephone cable for fax transmission and reception is connected, and controls an operation states of a chip for controlling fax transmission and reception and a functional block corresponding thereto.

Figure 6:
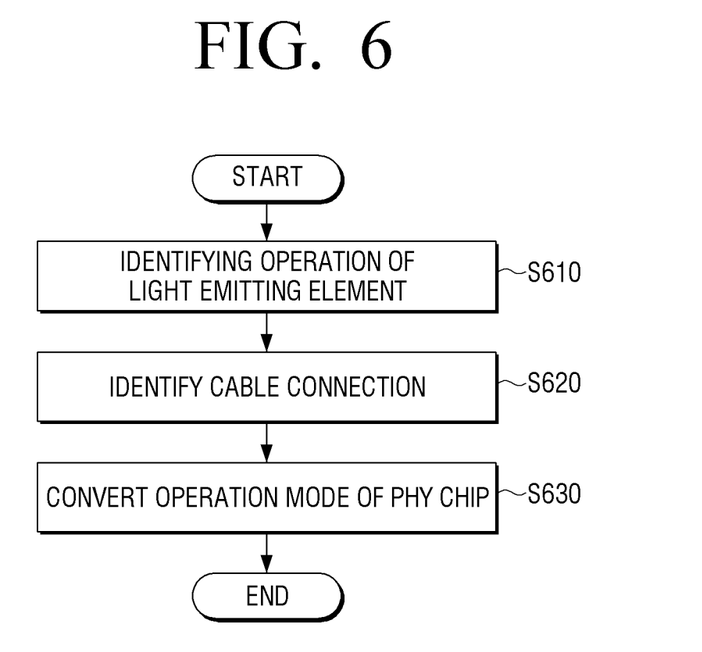
FIG. 6 is a flowchart illustrating a method for detecting a network cable according to an example.

FIG. 6 is a flowchart illustrating a method for detecting a network cable according to an example.

Referring to FIG. 6, an operation state of a light emitting element of a connector that displays a network connection state may be identified in operation S610. As an example, it can be identified whether the light emitting element of an RJ-45 connector is turned on or turned off.

In operation S620, it may be determined whether the network cable is connected to the connector based on the identified operation state of the light emitting element. As an example, when the light emitting element of the connector is emitting light, it may be determined that the network cable is connected to the connector. Further, if the light emitting element is not emitting light, it may be determined that the network cable is not connected. For example, when one of the ports of the processor 130 is electrically connected to the light emitting element of the connector 111, the processor 130 may determine whether the connection is achieved based on whether the port is in a low state or a high state.

The operation mode of the PHY chip that performs communication with a network by using a physical layer protocol may be converted based on whether the network cable is connected in operation S630. As an example, the operation mode of the PHY chip may be changed by changing the signal value of the reset signal provided to the PHY chip. For example, when the network cable is connected, the PHY chip may operate in a normal mode by way of maintaining the reset signal to a high value, and if the network cable is not connected, may operate in a power-saving mode by way of allowing the reset signal to have a low value.

In addition, if it is confirmed that the network cable is not connected to the connector, it may be possible to reduce power to a block performing the media access control for the physical layer protocol of the plurality of functional blocks of the processor.

In such a state where the network cable is not connected, that is, when power is reduced to the PHY chip, print data may be received by using a wireless communication chip. In addition, when print data is received through a wireless communication chip, the received print data may be printed.

As described above, the network cable detection method according to an example may determine whether the network cable is connected to the image forming apparatus in consideration of whether the light emitting element is turned on. In addition, the network cable detection method prevents unnecessary power consumption in the configuration for wired communication only when the network cable is not connected, which is advantageous for reducing power consumption, and particularly reduces power consumption in a power-saving mode.

The above-described network cable detection method may be implemented in a program and provided to the image forming apparatus. As an example, a program including a network cable detection method may be stored in a non-transitory computer readable medium to be provided.

Although examples have been shown and described, it will be appreciated by those skilled in the art that changes may be made to these examples without departing from the principles and spirit of the disclosure. Accordingly, the scope of the disclosure is not construed as being limited to the described examples, but is defined by the appended claims as well as equivalents thereto.

What is claimed is:

1. An image forming apparatus, comprising:
   a communication device including a physical layer protocol chip to communicate with a network by using a connector with a light emitting element for displaying a network connection state and a physical layer protocol;
   a print engine to perform a print job; and
   a processor to:
      based on print data being received through the communication device, control the print engine to print the received print data,
      determine whether a network cable is connected to the connector based on an operation state of the light emitting element, and
      based on a determination that the network cable is not connected to the connector, control the physical layer protocol chip to be in a power-saving state.

2. The apparatus as claimed in claim 1,
   wherein the physical layer protocol chip is to operate in a normal mode based on a reset signal of a high value being input, and is to operate in a power-saving mode based on a reset signal of a low value being input, and
   wherein the processor, based on the determination that the network cable is not connected to the connector, is to provide the reset signal of the low value to the physical layer protocol chip.

3. The apparatus as claimed in claim 2, wherein the processor is to:
   identify whether the network cable is connected at predetermined intervals, and
   based on the network cable being connected to the connector, provide the reset signal of the high value to the physical layer protocol chip.

4. The apparatus as claimed in claim 1, wherein the connector includes an RJ-45 connector including at least one Light Emitting Diode (LED).

5. The apparatus as claimed in claim 4, wherein the processor is electrically connected to one end of the LED.

6. The apparatus as claimed in claim 1, wherein the processor includes a plurality of functional blocks, and, based on a determination that the network cable is not connected to the connector, is to reduce power supply to a block that performs media access control with respect to the physical layer protocol among the plurality of functional blocks.

7. The apparatus as claimed in claim 1, wherein the processor is to control the print engine based on an operation mode of the image forming apparatus being a normal mode, the processor including a main processor to operate in a power-saving mode based on the operation mode of the image forming apparatus being the power-saving mode, and a sub-processor to identify whether the network cable is connected.

8. The apparatus as claimed in claim 7,
wherein the main processor includes a block to perform media access control with respect to the physical layer protocol, and
wherein the sub-processor, based on the determination that the network cable is not connected to the connector, is to control the main processor to reduce power supplied to the main processor.

9. The apparatus as claimed in claim 1, wherein the communication device further includes a wireless communication chip to communicate in a wireless manner, the communication device to receive print data by using the wireless communication chip in a state where the physical layer protocol chip is in the power-saving state.

10. The apparatus as claimed in claim 1,
wherein the physical layer protocol chip includes a wired physical layer protocol block to perform a physical layer protocol function with respect to the network cable and a wireless physical layer protocol block to perform a physical layer protocol function with respect to a wireless communication network, and
wherein the processor is to control the physical layer protocol chip to allow the wired physical layer protocol block to be in the power-saving state based on the network cable not being connected to the connector.

11. A method for detecting a network cable of an image forming apparatus, the method comprising:
identifying an operation state of a light emitting element of a connector for displaying a network connection state;
identifying whether a network cable is connected to the connector based on the identified operation state of the light emitting element; and
converting an operation mode of a physical layer protocol chip for performing communication with a network by using a physical layer protocol based on whether the network cable is connected.

12. The method as claimed in claim 11, wherein the converting of the operation mode of the physical layer protocol chip comprises converting the operation mode of the physical layer protocol chip by changing a signal value of a reset signal provided to the physical layer protocol chip.

13. The method as claimed in claim 11, further comprising:
based on identification that the network cable is not connected to the connector, performing power saving of a block that performs media access control with respect to the physical layer protocol among a plurality of functional blocks of a processor.

14. The method as claimed in claim 11, wherein the identifying of whether the network cable is connected to the connector comprises identifying that the network cable is connected to the connector based on the light emitting element of the connector emitting light.

15. The method as claimed in claim 11, further comprising:
receiving print data by using a wireless communication chip in a state where the physical layer protocol chip is in a power-saving state; and
printing the received print data.

16. The method as claimed in claim 11, wherein the identifying of whether a network cable is connected to the connector based on the identified operation state of the light emitting element comprises identifying whether the light emitting element emits light after an operation of transmitting and receiving preset data to an external device.

17. The method as claimed in claim 11, wherein the identifying of whether a network cable is connected to the connector based on the identified operation state of the light emitting element comprises determining, using a value of a signal received by the processor via an electrical connection to one end of the light emitting element.

18. The method as claimed in claim 11, further comprising:
identifying an operation state of a second light emitting element of the connector for displaying a second display connection state; and
identifying whether a fax cable is connected to the connector based on the identified operation state of the second light emitting element.

* * * * *